United States Patent
Pierce

Patent Number: 6,076,544
Date of Patent: Jun. 20, 2000

[54] AIR PUMP VALVE HEAD FOR BOTH SCHRADER AND PRESTA VALVES

[75] Inventor: Brendan E. Pierce, Los Gatos, Calif.

[73] Assignee: Bell Sports, Inc., San Jose, Calif.

[21] Appl. No.: 09/376,887

[22] Filed: Aug. 18, 1999

Related U.S. Application Data

[60] Provisional application No. 60/097,027, Aug. 18, 1998.

[51] Int. Cl.[7] .............................. F16K 15/20; F16K 51/00
[52] U.S. Cl. ........................ 137/223; 137/231; 251/149.8
[58] Field of Search .................................. 137/223, 231; 251/149.6, 149.8

[56] References Cited

U.S. PATENT DOCUMENTS

| | | | |
|---|---|---|---|
| 1,784,822 | 12/1930 | Crowley | 251/149.6 |
| 3,329,180 | 7/1967 | Van Brocklin | 251/149.6 X |
| 3,926,205 | 12/1975 | Gourlet | 137/223 |
| 5,379,796 | 1/1995 | Wang | 137/231 |
| 5,666,990 | 9/1997 | Wu | 137/223 |
| 5,749,392 | 5/1998 | Glotin | 137/231 |
| 5,902,097 | 5/1999 | Wu | 417/440 |
| 5,960,815 | 10/1999 | Wang | 137/118.03 |

OTHER PUBLICATIONS

"Rapiseal Leak Proof Connection", Barberi Bicycle Accessories, Nov. 20, 1995.

Primary Examiner—John Rivell
Assistant Examiner—Meredith H. Schoenfeld
Attorney, Agent, or Firm—Robert O. Guillot

[57] ABSTRACT

The valve head of the present invention is designed for engaging both a Schrader and a Presta valve. It includes a housing having generally cylindrical sidewalls and a base wall. A collet is disposed within the housing. The collet has generally cylindrical sidewalls and a plurality of upwardly extending collet fingers. A generally cylindrical gasket members is disposed within the collet. The gasket is composed of a resilient material and has a valve insertion bore formed centrally therethrough. A camming lever is operably engaged to the collet and functions to pull the collet downwardly into the housing. The downward movement of the collet causes the collet fingers to move inwardly, thereby creating an inwardly directed force upon the resilient gasket such that the diameter of the gasket bore is reduced. When a Schrader valve is disposed within the gasket bore, the downward movement of the collet causes the Schrader valve to move downwardly in frictional engagement with the gasket, and the downward motion of the Schrader valve upon a stationary actuator member projecting from the base of the housing opens the Schrader valve. A Presta valve disposed within the gasket bore is not drawn downwardly thus avoid damage to the Presta valve.

12 Claims, 5 Drawing Sheets

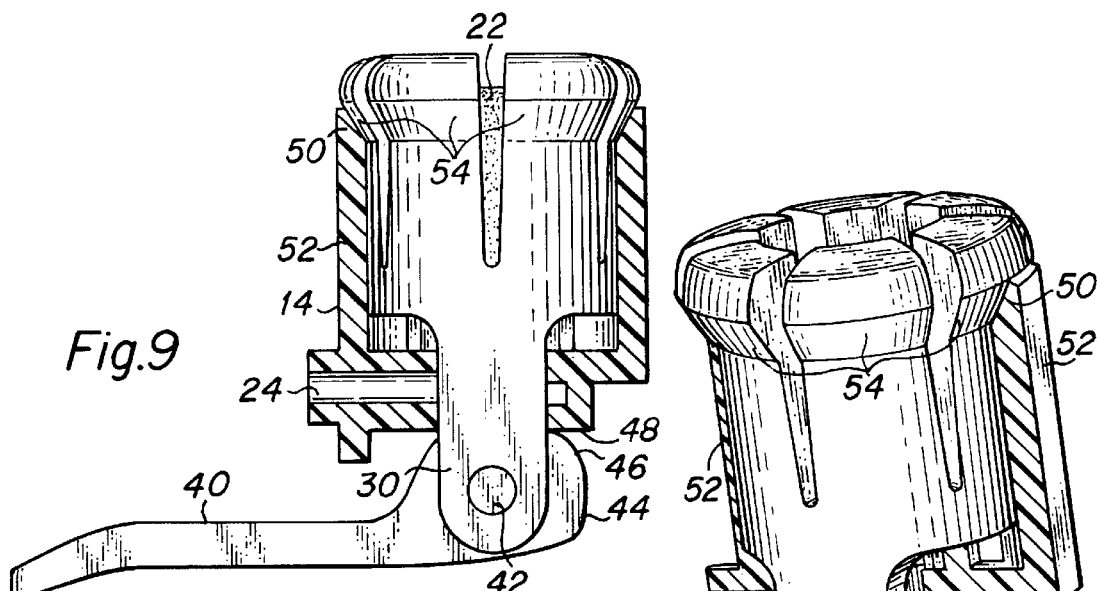
Fig.9
Fig.10
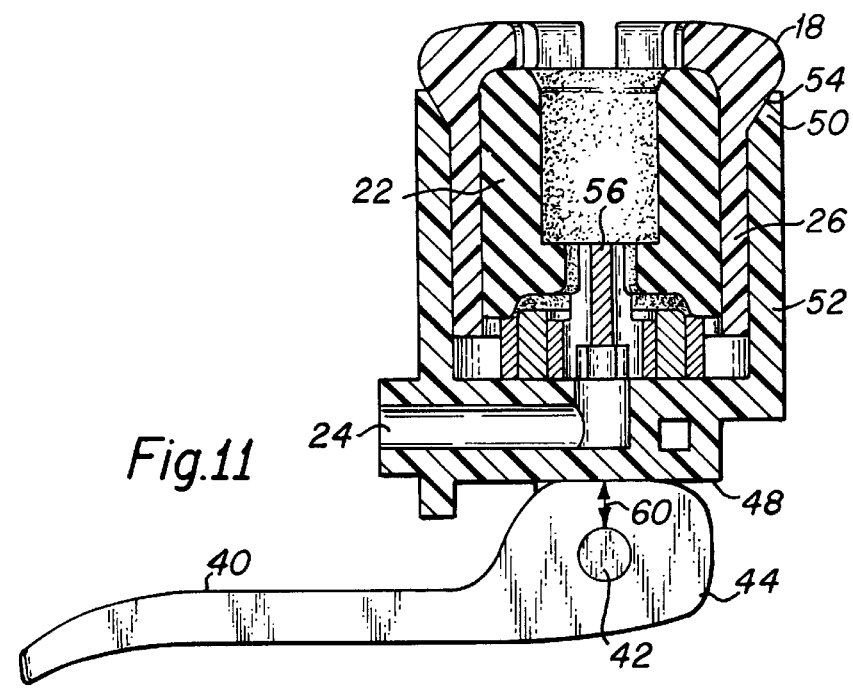
Fig.11

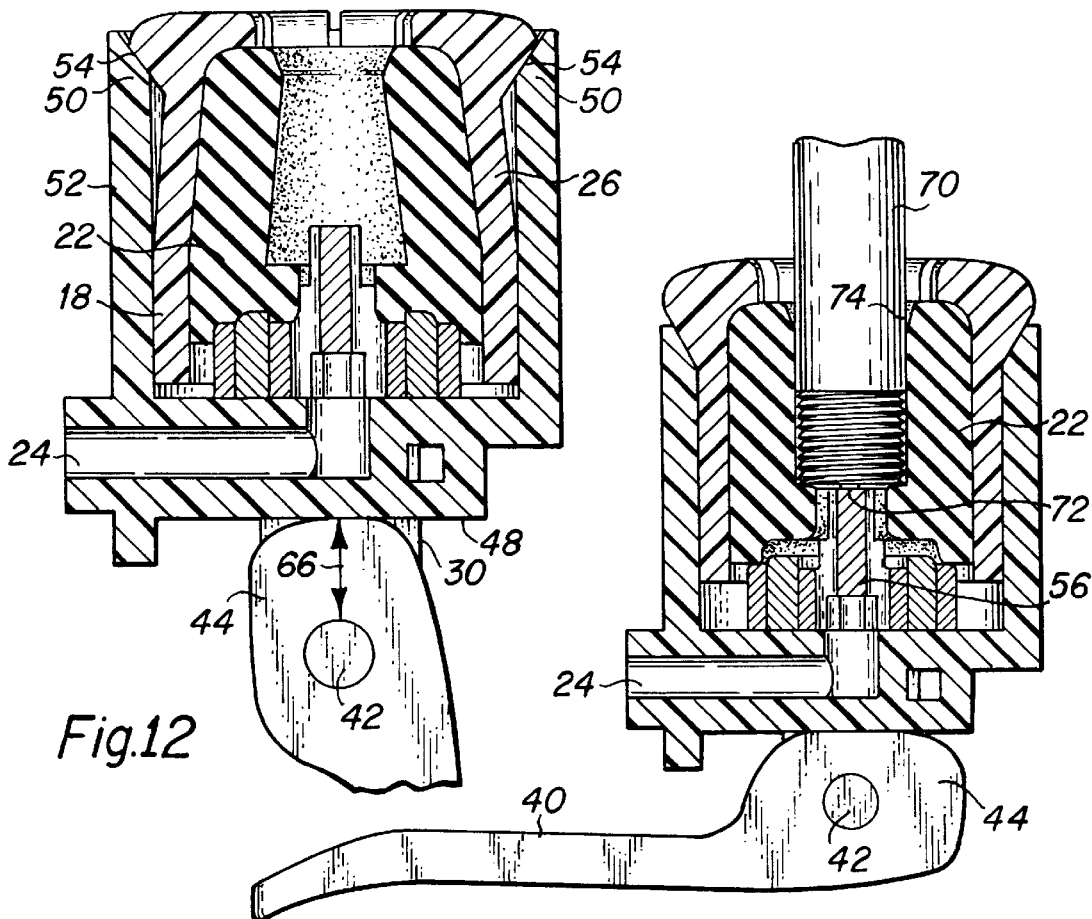
Fig.12
Fig.13
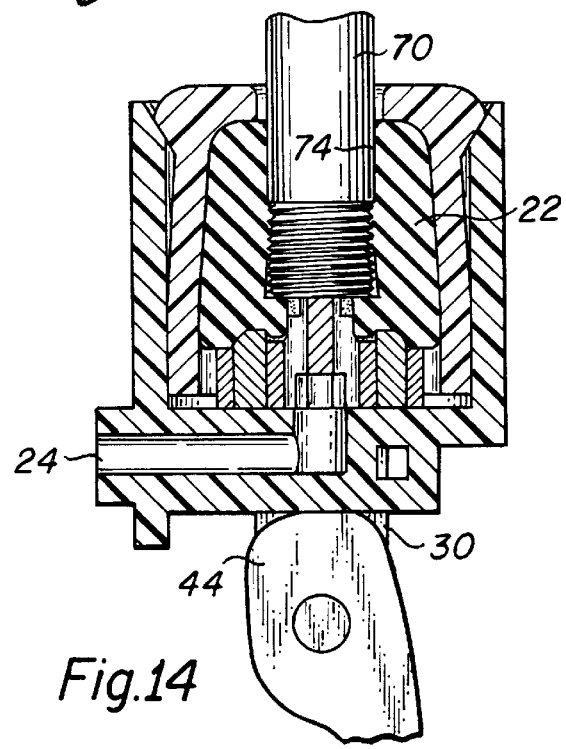
Fig.14

AIR PUMP VALVE HEAD FOR BOTH SCHRADER AND PRESTA VALVES

CROSS-REFERENCE TO RELATED APPLICATION

This application claims priority to U.S. Provisional Application Ser. No. 60/097,027, entitled: Air Pump Valve Head for Both Schrader and Presta Valves, filed 08/18/98, naming Brendan E. Pierce as inventor.

BACKGROUND OF THE INVENTION

1. Field of the Invention

The present invention relates generally to bicycle pump valve heads, and more particularly to a valve head that matingly engages both Schrader and Presta valves without any adjustment of the valve head components.

2. Description of the Prior Art

As is well known, bicycle tires have been manufactured for many years with two different types of air valves, the Schrader valve and the Presta valve. Therefore, it has been necessary for manufacturers to create two different valve heads, each of which can each mate with one of the two different valves. Some manufacturers have created a single valve head that is formed as a T, wherein one side of the T possesses a Schrader valve head and the other side of the T possesses a Presta valve head.

There have also been successful efforts to create a single valve head that is adaptable for mating with both Schrader and Presta valves. Such valve heads have included internal components that must be manipulated or changed, such that the valve head is engageable with a Schrader valve in one component configuration and is likewise engageable with a Presta valve in a second component configuration. While this type of single valve head has certain advantages over the prior art valve heads, the requirement that the user must alter the configuration of components within the valve head to change it from Schrader valve compatibility to Presta valve compatability has still created some difficulty and inconvenience. There is therefore a need for a single valve head that is compatible with both Schrader and Presta valve configurations, which valve head does not require any adjustments or internal valve component changes.

SUMMARY OF THE INVENTION

The valve head of the present invention is designed for engaging both a Schrader and a Presta valve. It includes a housing having generally cylindrical sidewalls and a base wall. A collet is disposed within the housing. The collet has generally cylindrical sidewalls and a plurality of upwardly extending collet fingers. A generally cylindrical gasket member is disposed within the collet. The gasket is composed of a resilient material and has a valve insertion bore formed centrally therethrough. A camming lever is operably engaged to the collet and functions to pull the collet downwardly into the housing. The downward movement of the collet causes the collet fingers to move inwardly, thereby creating an inwardly directed force upon the resilient gasket such that the diameter of the gasket bore is reduced. When a Schrader valve is disposed within the gasket bore, the downward movement of the collet causes the Schrader valve to move downwardly in frictional engagement with the gasket, and the downward motion of the Schrader valve upon a stationary actuator member projecting from the base of the housing opens the Schrader valve. A Presta valve disposed within the gasket bore is not drawn downwardly thus avoid damage to the Presta valve.

It is an advantage of the present invention that a single valve head that is capable of engaging both Schrader and Presta valves has been created.

Is another advantage of the present invention that a single valve head that engages both Schrader and Presta valves without the changing, adjustment or manipulation of components therein has been developed.

It is a further advantage of the present invention that a single valve head that engages both Schrader and Presta valves has been developed which is easy to utilize.

It is yet another advantage of the present invention that a single valve head for the engagement of both Schrader and Presta valves has been developed which is easy and relatively inexpensive to manufacture.

These and other features and advantages of the present invention will become well understood by those skilled in the art upon reading the following detailed description which makes reference to the several figures of the drawings.

IN THE DRAWINGS

FIG. 9 is a side cut-away view depicting the collet and gasket within the valve head;

FIG. 10 is a cut-away perspective view depicting the collet within the valve head housing;

FIG. 11 is a side cross-sectional view depicting the valve head in an unengaged configuration;

FIG. 12 is a side cross-sectional view of the valve head in a valve engaged configuration;

FIG. 13 is a side cross-sectional view depicting a Schrader valve within the valve head in an unengaged configuration;

FIG. 14 is a side cross-sectional view of the valve head having a Schrader valve disposed therein in an engaged configuration;

DESCRIPTION OF THE INVENTION

Figure 1:
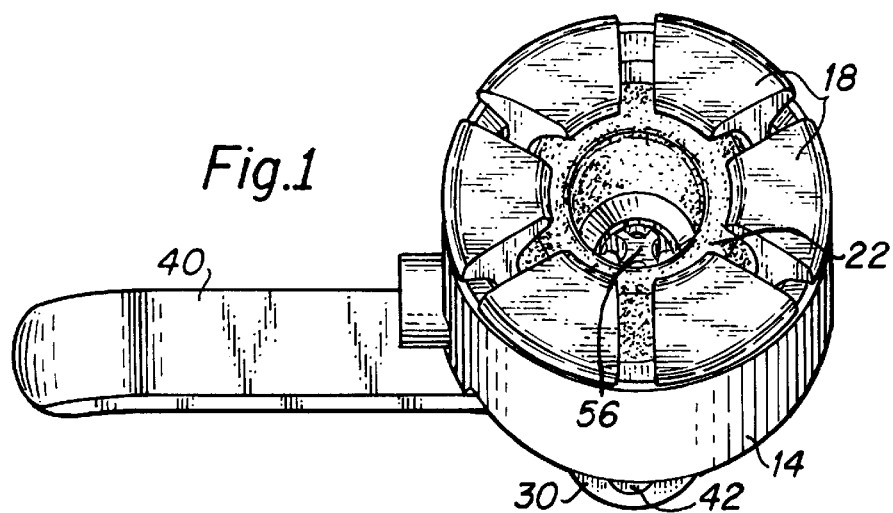
FIG. 1 is a perspective view of the valve head of the present invention.
Figure 2:
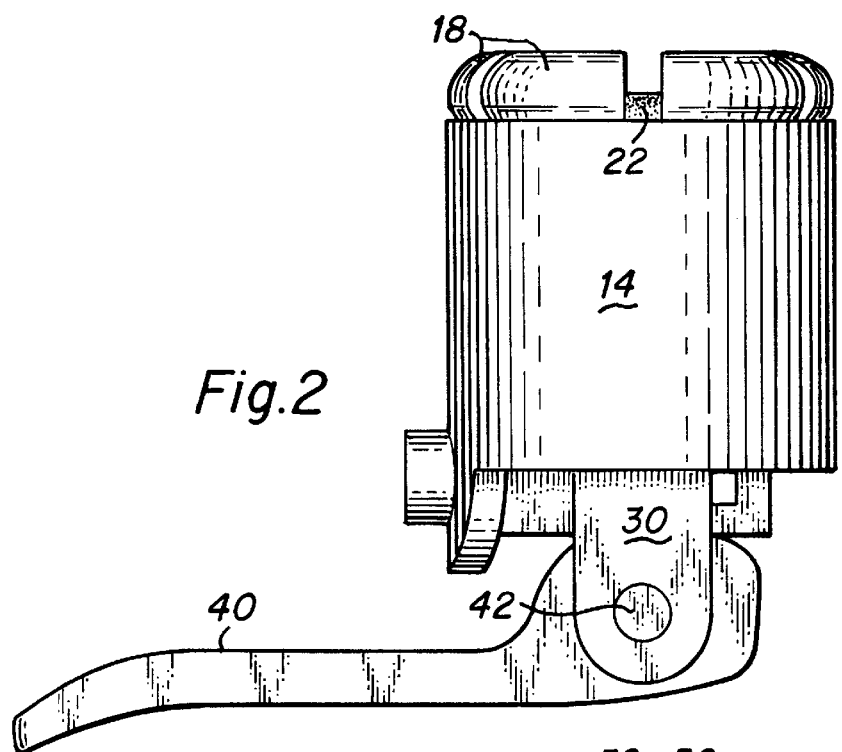
FIG. 2 is a side elevational view of the valve head.
Figure 3:
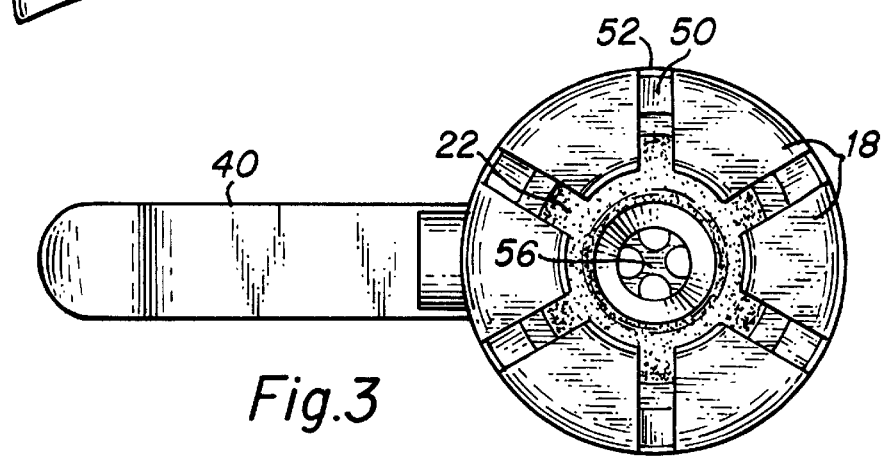
FIG. 3 is a top plan view of the valve head.
Figure 4:
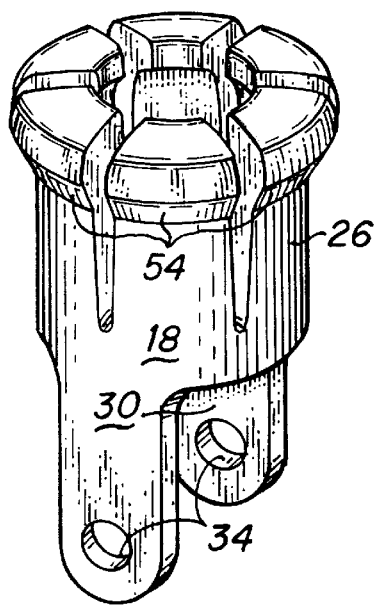
FIG. 4 is an upper perspective view of the collet of the valve head.
Figure 5:
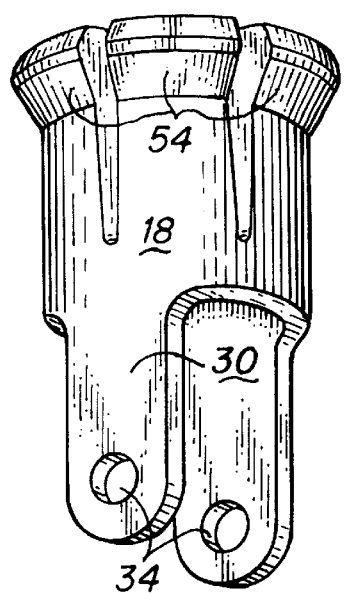
FIG. 5 is a lower perspective view of the collet.
Figure 6:
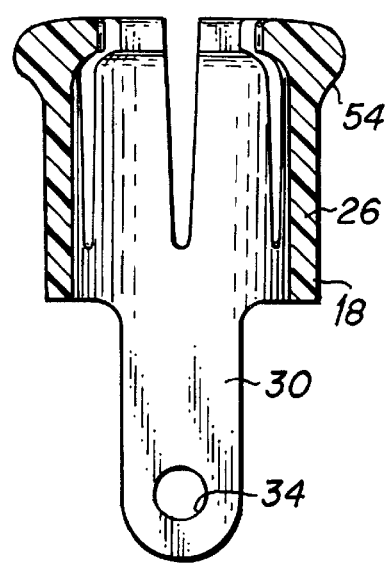
FIG. 6 is a cross-sectional view of the collet.

The present invention is an air pump valve head that is adaptable for engaging both Schrader valves and Presta valves that are typically found on bicycle tires. FIG. 1 is a perspective view of the valve head, FIG. 2 is a side elevational view of the valve head and FIG. 3 is a top plan view of the valve head. As depicted in FIGS. 1, 2 and 3, the valve head 10 includes a cylindrical outer housing 14 having a collet 18 and resilient gasket 22 disposed therewithin. The collet 18 is a generally cylindrical member and the gasket 22 is likewise generally cylindrically shaped, and it resides within the collet 18. FIG. 4 is a perspective view of the collet 18, FIG. 5 is a lower perspective view of the collet 18 and FIG. 6 is a cross-sectional view of the collet. As depicted in FIGS. 4, 5 and 6, the collet 18 includes a plurality of flexible fingers 26 in its upper portion and two downwardly projecting arms 30 having pin holes 34 formed therethrough.

Figure 7:
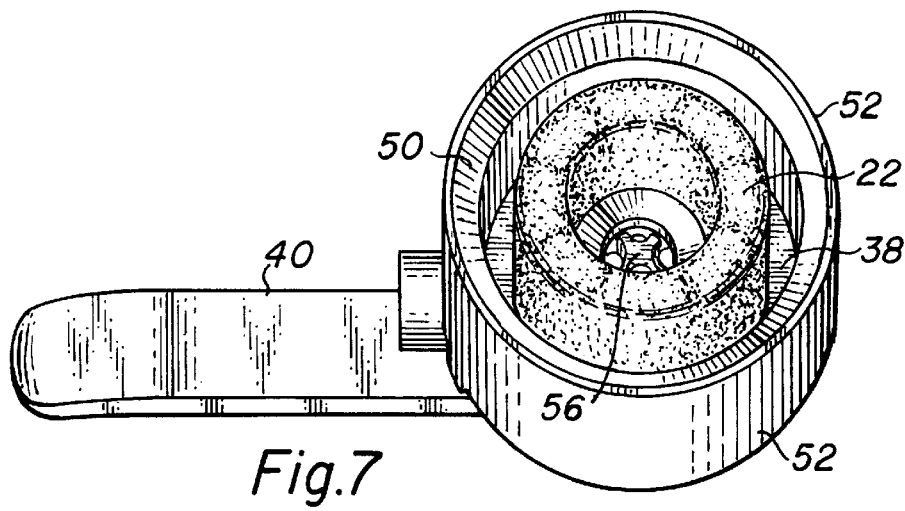
FIG. 7 is a perspective view of the gasket disposed within the valve head housing.
Figure 8:
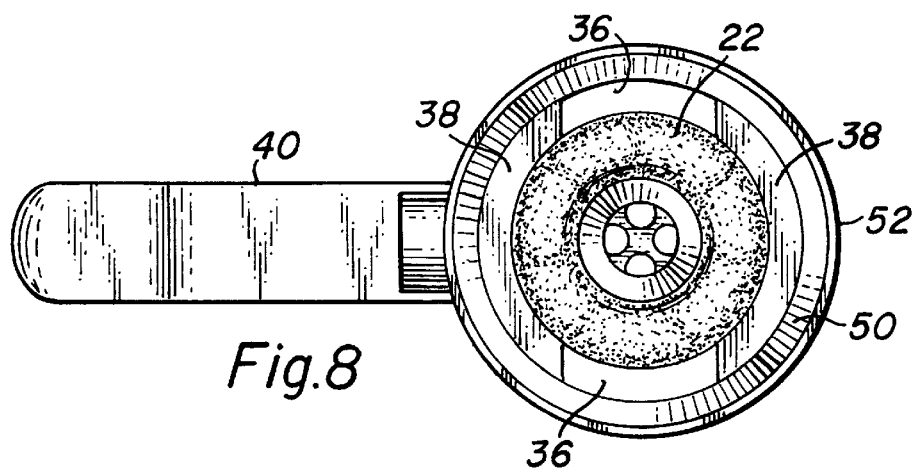
FIG. 8 is a top plan view of the gasket disposed within the valve head housing.

By way of further explanation, FIG. 7 is a perspective view of the gasket 22 disposed within the valve head housing 14, FIG. 8 is a top plan view of the gasket 22 disposed within the valve head housing 14, FIG. 9 is a side cut-away view depicting the collet 18 and gasket 22 within the valve head housing 14, and FIG. 10 is a cut-away perspective view depicting the collet 18 within the valve head housing 14. As is best seen in the FIGS. 8 and 9, the collet arms 30 project downwardly through arm slots 36 formed in the base 38 of the housing 14. A lever 40 is engaged by a pin 42 to the collet arms 30. The head portion 44 of the actuating lever 40 has a camming surface 46 which slidably engages the lower surface 48 of the valve housing 14. Air from a pump (not shown) moves through an air passage 24 into the housing 14. The upper inner edges 50 of the housing sidewalls 52 are beveled inwardly to slidably engage outwardly beveled sidewalls 54 of the collet fingers 26. A stationary projecting Schrader valve actuator 56, best seen in FIG. 7, is centrally disposed in the base of the housing 14.

The operation of the valve head 10 is next described with the aid of FIGS. 11 and 12, wherein FIG. 11 is a side cross-sectional view depicting the valve head in an unengaged configuration, and FIG. 12 is a side cross-sectional view of the valve head in a valve engaged configuration. As is seen with the aid of FIGS. 11 and 12, when the valve head 10 is in the unengaged configuration, the short portion 60 of the cam head 44 is disposed against the housing surface 48. The collet is in its upward position and the resilient gasket is not compressed; that is, the central bore of the gasket is cylindrical. When the valve is disposed in its engaged configuration (FIG. 12) the lever 40 is actuated such that the long portion 66 of the cam head 44 is disposed against the lower surface 48 of the valve housing 14. When the cam head is so rotated, the pin 42 is moved downwardly, thus pulling the collet 18 downwardly due to the engagement of the collet arms 30 with the pin 42. When the collet is moved downwardly, the collet fingers 26 are urged radially inwardly due to the slidable engagement of the collet sidewalls 54 with the beveled surface 50 of the valve housing sidewalls 52. The radially inward movement of the collet fingers 26 is symmetrical about the central axis of the collet 18 and the inward movement causes the resilient gasket 22 to deform radially inwardly about its central axis. Additionally, because the collet fingers 26 move both downwardly and inwardly, the resilient gasket 22 also moves both downwardly and inwardly.

FIGS. 13 and 14 depict the engagement of a Schrader valve 70 within the valve head 10. As depicted in FIG. 13, the Schrader valve is 70 inserted within the valve head such that the pressable valve pin 72 of the Schrader valve is disposed against the stationary, projecting actuator 56 of the valve head. The inner diameter of the gasket 22 is sized to receive the Schrader valve therewithin. Thereafter, as depicted in FIG. 14, when the lever 40 is rotated the gasket 22 is squeezed radially inwardly by the inward motion of the collet fingers 26 as described hereabove to grab and seal against the outer surface 74 of the Schrader valve. Additionally, because the collet also moves downwardly, as described hereabove, the Schrader valve is pulled downwardly, such that the Schrader valve pin 72 is depressed inwardly by the actuator 56. When the Schrader valve is thus sealingly engaged by the gasket and its pin is depressed, air may be pumped through the valve head air passage 24 and into the Schrader valve and the tire or other device to which it is engaged.

Figure 15:
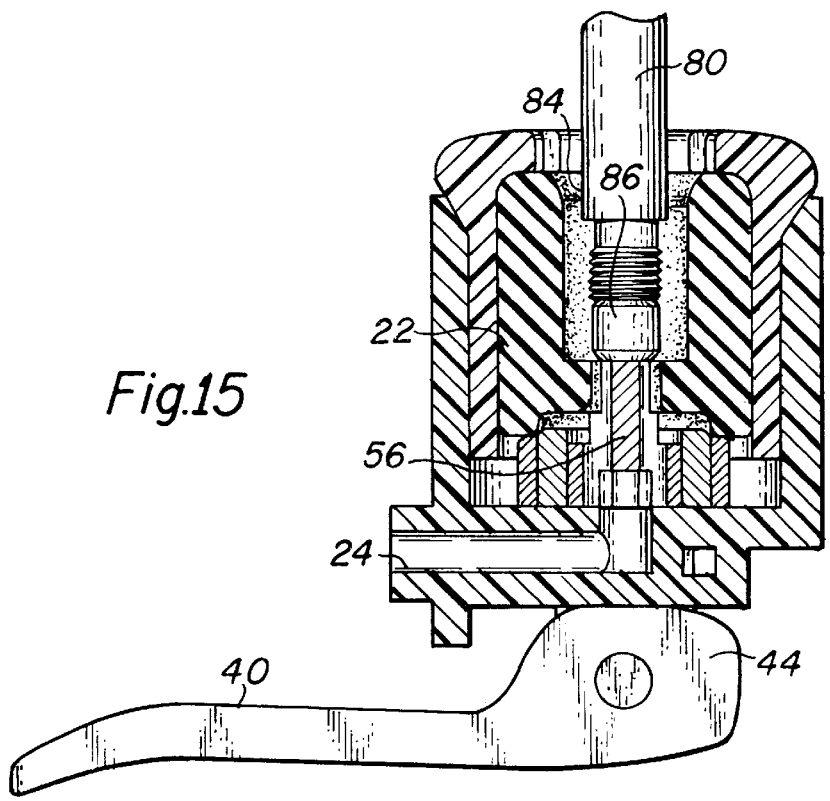
FIG. 15 is a side cross-sectional view of the valve head having a Presta valve disposed therewithin in an unengaged configuration.
Figure 16:
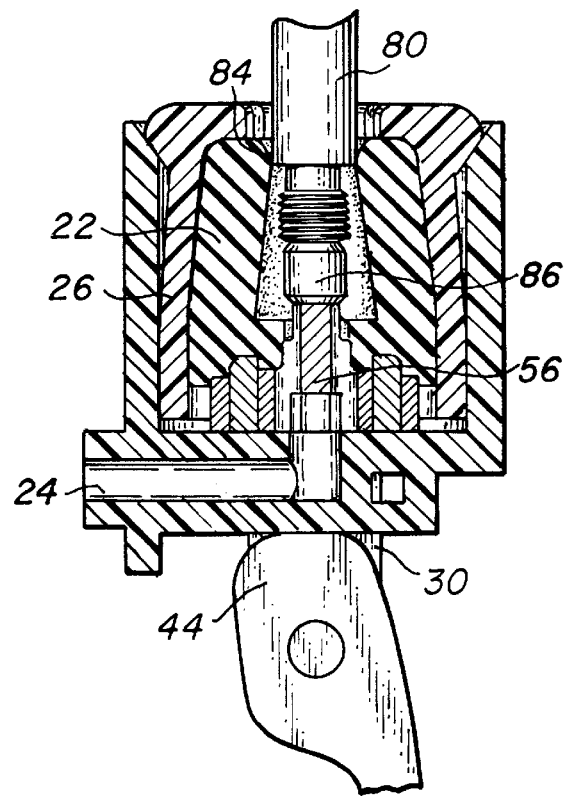
FIG. 16 is a side cross-sectional view of the valve head having a Presta valve disposed therewithin in an engaged configuration.

FIGS. 15 and 16 depict the engagement of a Presta valve 80 within the valve head 10. As depicted in FIG. 15, a Presta valve 80 is centrally disposed within the valve head 10 in an unengaged configuration. Because the Presta valve has a smaller diameter than the Schrader valve, the sidewalls of the gasket do not come close to engaging it. However, as depicted in FIG. 16, when the valve head is actuated by rotation of the lever 40, the inward movement of the collet fingers 26 and therefore the resilient gasket 22 is sufficient to cause the gasket 22 to sealingly engage the outer surface 84 of the relatively narrow Presta valve 80. The outer valve tip 86 of the Presta valve 80 rests against the stationary actuator 56 in its inward configuration, which allows air to be pumped into the Presta valve and thereafter into the object to which the Presta valve is engaged.

Significant features of the valve head 10 are that the valve head actuator 56 does not move when the valve head is actuated through the lever 40. Rather, the actuator 56 is stationary and the Schrader valve 70 is engaged and pulled downwardly towards the stationary actuator 56 by the collet 18. Owing to the narrow diameter of the Presta valve 80, the resilient member 22 of the valve head is urged inwardly to engage its outer surface 84, but in this configuration the Presta valve is not pulled significantly downwardly against the actuator 56. A significant downward force on the Presta valve could damage it and should be avoided. It is therefore to be understood that the valve head 10 simply and efficiently engages both Schrader and Presta valves by the radially inward motion of the collet fingers 26 and the resilient gasket 22. The Schrader valve is pulled downwardly to activate it, whereas the Presta valve is not pulled downwardly to a significant degree.

What I claim is:

1. A valve head for engaging both a Schrader valve and a Presta valve, comprising:
    a housing and a resilient gasket disposed within said housing, and a collet being engaged within said housing and acting to apply radial pressure against said gasket, said gasket being activatable to provide radial pressure against a Schrader valve disposed within said gasket and to pull the Schrader valve against a stationary actuator member disposed within said housing.

2. A valve head as described in claim 1 wherein said valve head further includes a cam lever being rotatably engaged to said collet and functioning to pull said collet downward within said housing.

3. A valve head as described in claim 1 wherein said collet includes deformable finger portions for gripping said gasket.

4. A valve head as described in claim 3 wherein said housing includes a beveled surface sidewall portion, and wherein said collet fingers include sidewall surfaces that are slidably engagable with said beveled surface of said housing, whereby said collet fingers are urged inwardly in contact with said beveled surface.

5. A valve head for engaging both a Schrader and a Presta valve, comprising:
    a housing having generally cylindrical sidewalls and a base wall;
    a collet having a generally cylindrical sidewall and a plurality of upwardly extending collet fingers engaged with said collet sidewall, said collet being disposed within said housing;

a gasket being generally cylindrical and having a valve insertion bore formed centrally therethrough, said gasket being composed of a resilient material, and wherein said gasket is disposed within said collet;

a camming lever being operably engaged to said collet and functioning to pull said collet downwardly into said housing;

whereby the downward movement of said collet creates an inwardly directed force upon said resilient gasket such that the diameter of said gasket bore is reduced.

6. A valve head as described in claim 5 wherein said collet fingers include upper ends that are formed with outwardly projecting portions for engaging said sidewalls of said housing, such that upon said downward movement of said collet said collet fingers are caused to move radially inwardly due to a sliding engagement of said outwardly projecting portions of said collet fingers with said housing sidewalls.

7. A valve head as described in claim 6 wherein said housing base is formed with two openings therethrough, and wherein said collet is formed with downwardly projecting sidewall arms that project through said openings in said housing base, and wherein said camming lever is rotatably engaged with said collet arms.

8. A valve head as described in claim 5 wherein a stationary actuator member is disposed within said housing to project upwardly from said base of said housing, and wherein a Schrader valve that is disposed within said gasket bore is frictionally engaged by said gasket and drawn downwardly upon said actuator member when said collet is moved downwardly by said camming lever.

9. A valve head as described in claim 5 wherein a Presta valve that is disposed within said gasket bore is frictionally engaged by said gasket and not pulled downwardly within said housing when said collet is pulled downwardly by said camming lever.

10. A valve head for engaging both a Schrader and a Presta valve, comprising:

a housing having generally cylindrical sidewalls and a base wall, said base wall having two openings formed therethrough;

a collet being disposed within said housing, said collet having generally cylindrical sidewall portions and a plurality of upwardly extending collet fingers integrally formed within said collet sidewall portions, said collet fingers including upper ends that are formed with outwardly projecting portions for engaging the sidewalls of said housing, and said collet being formed with downwardly projecting arm portions that project through said openings in said housing base;

a gasket being disposed within said collet, said gasket being generally cylindrical and having a valve insertion bore formed centrally therethrough, said gasket being composed of a resilient material;

a camming lever being operably engaged to said collet arms and functioning to pull said collet downwardly into said housing, such that upon said downward movement of said collet said collet fingers are caused to move radially inwardly due to a sliding engagement of said outwardly projecting portions of said collet fingers with said housing sidewalls;

whereby the inward movement of said collet fingers creates an inwardly directed force upon said resilient gasket such that the diameter of said gasket bore is reduced.

11. A valve head as described in claim 10 wherein a stationary actuator member is disposed within said housing to project upwardly from said base of said housing, and wherein a Schrader valve that is disposed within said gasket bore is frictionally engaged by said gasket and drawn downwardly upon said actuator member when said collet is moved downwardly by said camming lever.

12. A valve head as described in claim 11 wherein a Presta valve that is disposed within said gasket bore is frictionally engaged by said gasket and not pulled downwardly within said housing when said collet is pulled downwardly by said camming lever.

* * * * *